(12) United States Patent
Lin et al.

(10) Patent No.: US 8,421,429 B2
(45) Date of Patent: Apr. 16, 2013

(54) CONTROL CIRCUIT AND METHOD FOR A POWER CONVERTER CONTROLLING ADAPTIVE VOLTAGE POSITION

(75) Inventors: Yu Cheng Lin, Pingtung (TW); Dan Chen, Taipei (TW); Wei-Hsu Chang, Zhubei (TW)

(73) Assignee: Richtek Technology Corp., ChuPei (TW)

( * ) Notice: Subject to any disclaimer, the term of this patent is extended or adjusted under 35 U.S.C. 154(b) by 533 days.

(21) Appl. No.: 12/701,465

(22) Filed: Feb. 5, 2010

(65) Prior Publication Data
US 2011/0084676 A1 Apr. 14, 2011

(30) Foreign Application Priority Data

Oct. 12, 2009 (TW) ................................ 98134525 A

(51) Int. Cl.
*G05F 1/00* (2006.01)
(52) U.S. Cl.
USPC ......................................................... 323/283

(58) Field of Classification Search .................... 323/283
See application file for complete search history.

(56) References Cited

U.S. PATENT DOCUMENTS

| | | | | |
|---|---|---|---|---|
| 2007/0067069 A1* | 3/2007 | Markowski | .................... | 700/297 |
| 2007/0069706 A1* | 3/2007 | Chapuis et al. | ................ | 323/283 |
| 2008/0157737 A1* | 7/2008 | Chang et al. | ................... | 323/282 |
| 2008/0310201 A1* | 12/2008 | Maksimovic | .................... | 363/85 |

* cited by examiner

*Primary Examiner* — Adolf Berhane
*Assistant Examiner* — Gustavo Rosario Benitez

(57) ABSTRACT

A control circuit and method for controlling a power converter comprises an adder, a digital compensator, and a pulse width modulation circuit. The adder acquires an output voltage difference between the output voltage and the reference output voltage. The digital compensator, which has a Z-domain transfer function, references the output voltage difference to generate a pulse width control signal with the least significant bits of the denominator coefficient in the Z-domain transfer function being regulated to achieve the load line function of the power converter. Further, the pulse modulation circuit is controlled by the pulse width control signal to generate the pulse width modulation signal to control ON/OFF of the power converter.

10 Claims, 4 Drawing Sheets

CONTROL CIRCUIT AND METHOD FOR A POWER CONVERTER CONTROLLING ADAPTIVE VOLTAGE POSITION

BACKGROUND OF THE INVENTION

1. Field of the Invention

The present invention is related to a power converter and particularly to a control circuit and method for the power converter controlling adaptive voltage position (AVP).

2. Brief Description of the Related Art

Due to the semiconductor technology being developed progressively, the digital products such as the computer and the peripherals thereof are capable of being upgraded continuously. The fast change of the manufacturing process for the semiconductor results in a variety of demands for the power source of the integrated circuit (IC) employed in the computer and the peripherals thereof. Hence, various combinations of voltage regulators using such as the boost converter and the buck converter to meet the need of different power sources of the integrated circuit become one of the most important factors to offer versatile digital products.

The light load efficiency of the power converter has been getting to be valued in the recent years; as to the power of the central processing unit (CPU), the technique of adaptive voltage position has been widely applied in the voltage regulator module (VRM). Several technical literatures related to designing the adaptive voltage position are listed in the following:

[1] Kaiwei Yao, Ming Xu, Yu Meng and Fred C. Lee, "Design Consideration for VRM Transient Response Based on the Output Impedence," IEEE Trans. Power Electron., vol. 18, no. 6, pp. 1270-1277, November 2003.

[2] Martin Lee, Dan Chen, Kevin Huang, Chih Wen Liu, Ben Tai, "Modeling and Design for Novel Adaptive Voltage Position (AVP) Scheme for Multiphase VRMs," IEEE Trans. Power Electron., vol. 23, no. 4, pp. 1733-1742, July 2008.

[3] Ching-Jan Chen, Dan Chen, Martin Lee, Eddie Kuo-Lung Tseng, "Design and Modeling of a Novel High-Gain Peak Current Control Scheme to achieve Adaptive Voltage Positioning for DC Power Converters," PESC 2008.

[4] Jian Rong Huang, Sophia Chien-Hui Wang, Chia Jung Lee, Eddie Kuo-Lung Tseng, Dan Chen, "Native AVP Control Method for Constant Output Impedance of DC Power Converters," in Proc. IEEE Power Electronics Specialists Conference., 2007, pp. 2023~2028

[5] K. Yao, Y. Ren, J. Sun, K. Lee, M. Xu, J. Zhou, and F. C. Lee, "Adaptive voltage position design for voltage regulators," in Proc. IEEE Applied Power Electronics Conf., 2004, Vol. 1, pp. 272-278.

Besides, in order to promote the efficiency, a concept of variable load line (VLL) shown in FIG. 1 has been proposed too. The variable load line means that a single phase converter is operated with the light load and multiphase converters are operated with the heavy load so as to promote the efficiency of the light load. Further, the maximum value and the minimum value of the output voltage of the converter keep the same regardless a phase or multiple phases are operated.

For instance, in FIG. 1, the load line 11 is a line representing one-phase converter operating with load current from 0 to 20 A; the load line 12 is a line representing two-phase converter operating with load current from 0 to 40 A; the load line 13 is a line representing three-phase converter operating with load current from 0 to 60 A; the load line 14 is a line representing four-phase converter operating with load current from 0 to 80 A. The maximum value $V_{max}$ and the minimum value $V_{min}$ of the output voltage of the converter for the load lines 11, 12, 13 and 14 are identical.

The control method for the power converter with adaptive voltage position disclosed in the preceding literatures are designed for the analog controller. Although it is capable of performing control of adaptive voltage position with negative load line with the output voltage decreasing during the load current increasing, it is incapable of performing control of adaptive voltage position with positive load line with the output voltage decreasing during the load current increasing. In addition, the load line of the power converter is unchangeable and it is incapable of offering the variable load line operated in the multiphase converter.

SUMMARY OF THE INVENTION

Accordingly, a main object of the present invention is to provide a control circuit and method for a power converter controlling adaptive voltage position with which functions of controlling the negative and positive load lines and function of variable load line required by the operation of multiphase converter can be performed easily without complicated operations.

In order to achieve the preceding object and other objects, a control circuit and method for a power converter controlling adaptive voltage position according to the present invention is suitable for generating a pulse width modulation signal to control ON/OFF of a power switch in the power converter; the control circuit comprises a first adder, a digital compensator and a pulse width modulation circuit, wherein the first adder receives an output voltage and a reference output voltage of the power converter and acquires an output voltage difference between the output voltage and the reference output voltage; the digital compensator has an Z-domain transfer function to reference to the output voltage difference to generate a pulse width control signal and to regulate least significant bits of the denominator coefficient in the Z-domain transfer function such that function of a load line such as positive load line, negative load line or variable load line of the power converter is performed via control of said pulse width control signal; and the pulse width modulation circuit controlled by the pulse width control signal to generate the pulse width modulation signal.

In a preferred embodiment, the control circuit further comprises a second adder, a feed-forward control circuit and a third adder, wherein the second adder receives an input voltage and a reference input voltage of the power converter and acquires an input voltage difference between the input voltage and the reference input voltage; the feed-forward control circuit references to said input voltage difference to generate a compensation voltage; the third adder receives the compensation voltage and a standard reference voltage of the power converter to calculate the sum of the compensation voltage and the standard reference voltage to generate the reference output voltage.

In a preferred embodiment, the Z-domain transfer function of the control circuit is expressed as $$Comp_D(z) = \frac{\sum_{i=0}^{n} b_i \cdot z^{-i}}{1 + \sum_{i=1}^{n} a_i \cdot z^{-i}}$$

and the regulated least significant bits of said denominator coefficient $a_i$ in said Z-domain transfer function are least 4 significant bits of the denominator coefficient $a_i$ represented by float point number.

A control circuit and method for a power converter controlling adaptive voltage position according to the present invention is to regulate the least significant bits of a denominator coefficient in the Z-domain transfer function for performing a function of a load line of the power converter such that functions of the negative or positive load lines and function of variable load line required by the operation of multiphase converter can be achieved easily without complicated operations.

BRIEF DESCRIPTION OF THE DRAWINGS

The detailed structure, the applied principle, the function and the effectiveness of the present invention can be more fully understood with reference to the following description and accompanying drawings, in which.

DETAILED DESCRIPTION OF THE INVENTION

Figure 1:
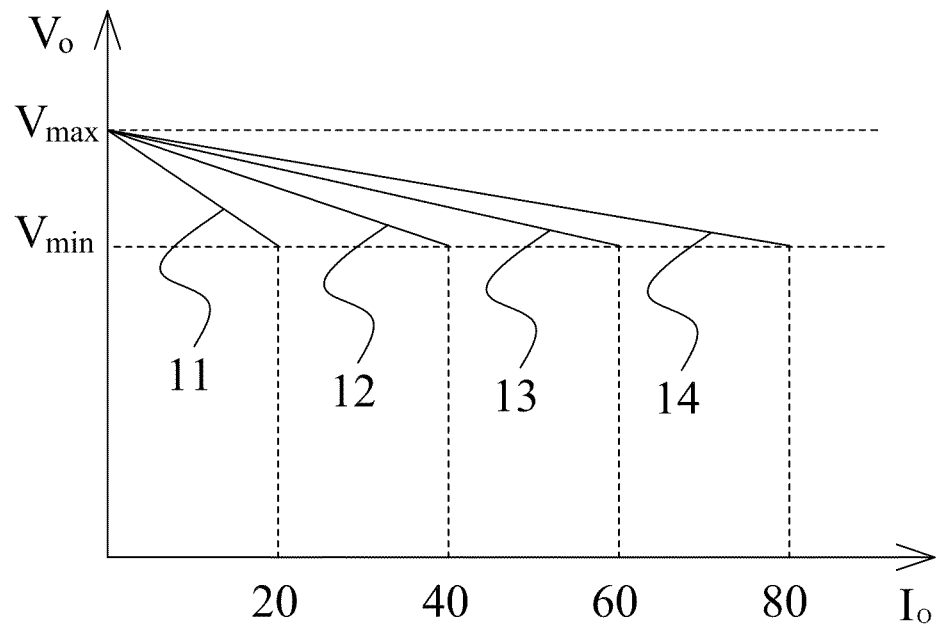
FIG. 1 is a graph illustrating variable load lines of the conventional multiphase converter.
Figure 2:
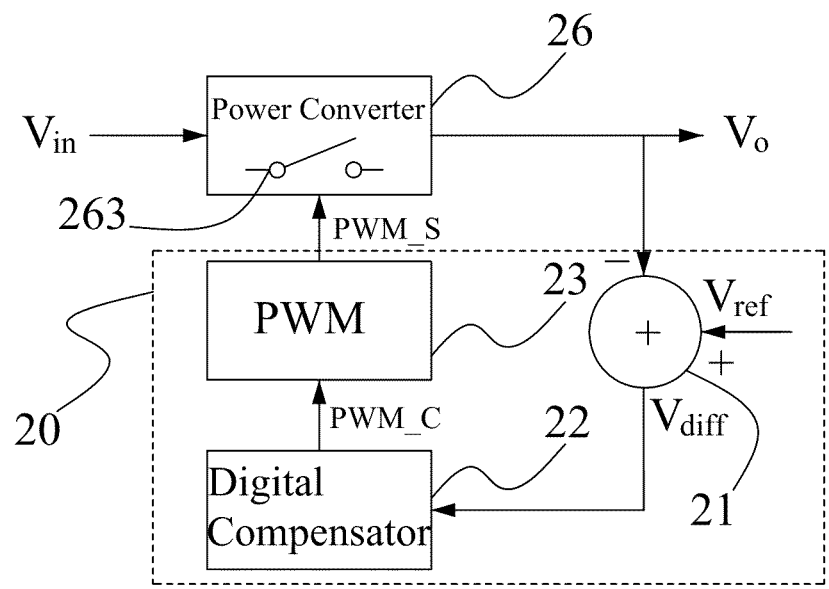
FIG. 2 is a block diagram illustrating the first embodiment of a control circuit for a power converter controlling adaptive voltage position according to the present invention.

Referring to FIG. 2, the first preferred embodiment of a control circuit for a power converter controlling adaptive voltage position according to the present invention is illustrated. In FIG. 2, the control circuit 20 comprises an adder 21, a digital compensator 22 and a pulse width modulation circuit 23 which perform steps of the control method for the power converter to generate a pulse width modulation signal PWM_S to control ON/OFF of a power switch 263 of the power converter 26.

Wherein the adder 21 receives an output voltage $V_o$ and a reference output voltage $V_{ref}$ of the power converter 26 and acquires an output voltage difference $V_{diff}$ between the output voltage $V_o$ and the reference output voltage $V_{ref}$. The digital compensator 22 has an Z-domain transfer function to reference to the output voltage difference $V_{diff}$ sent out by the adder 21 to generate the pulse width control signal PWM_C and to regulate the least significant bits of denominator coefficient in the Z-domain transfer function such that a load line function of the power converter 26 can be performed via control of the pulse width control signal PWM_C. The pulse width modulation circuit 23 is controlled by the pulse width control signal PWM_C to generate the pulse width modulation signal PWM_S to control ON/OFF of the power switch 263 of the power converter 26.

The Z-domain transfer function of the digital compensator 22 is expressed as the following equation:

$$Comp_D(z) = \frac{\sum_{i=0}^{n} b_i \cdot z^{-i}}{1 + \sum_{i=1}^{n} a_i \cdot z^{-i}} \quad (1)$$

wherein $a_i$ is the denominator coefficient, $b_i$ is the numerator coefficient, and n is the order of filter of the digital compensator 22.

Suppose that z=1 in equation (1), the low-frequency loop gain of the digital compensator 22 is obtained as the following equation:

$$Comp_D(1) = \frac{Num_D(1)}{Den_D(1)} = \frac{\sum_{i=0}^{n} b_i}{1 + \sum_{i=1}^{n} a_i} \quad (2)$$

If the least significant bits of the denominator coefficient $a_i$ in Z-domain transfer function of the digital compensator 22 are regulated and the denominator coefficient $a_i$ is changed to $a_i'$ after the least significant bits are regulated, and let $$x = 1 + \sum_{i=1}^{n} a_i', \quad y = \sum_{i=0}^{n} b_i,$$

the low-frequency loop gain in equation (2) can be expressed as the following equation:

$$Comp_D(1) = \frac{Num_D(1)}{Den_D(1)} = \frac{\sum_{i=0}^{n} b_i}{1 + \sum_{i=1}^{n} a_i'} = \frac{y}{x} \quad (3)$$

If the number of bits of the denominator coefficient $a_i$ represented by float point number in Z-domain transfer function of the digital compensator 22 is Q, and the number of bits of the maximum truncation error is P, an adjustable extent $\Delta x$ of x is expressed as the following equation:

$$\Delta x = \pm \sum_{n=P}^{Q} c_n \cdot 2^{-n} \quad C_n = \{0, 1\} \quad (4)$$

Thus, regulating the least significant bits of the denominator coefficient $a_i$ in Z-domain transfer function of the digital compensator 22 is capable of controlling negative load line or positive load line and performing variable load line required by operation of the multiphase converter easily due to change of the low-frequency loop gain. Generally, in case of least 4 significant bits of the denominator coefficient $a_i$ represented by float point number being regulated, positions of low-frequency pole and zero-cross are affected only, and the band width and the phase margin are hardly affected such that there is no problem of unsteadiness. Nevertheless, there is a possibility that the line regulation of the voltage regulator is affected due to the feature of lower direct current loop gain.

Figure 3:
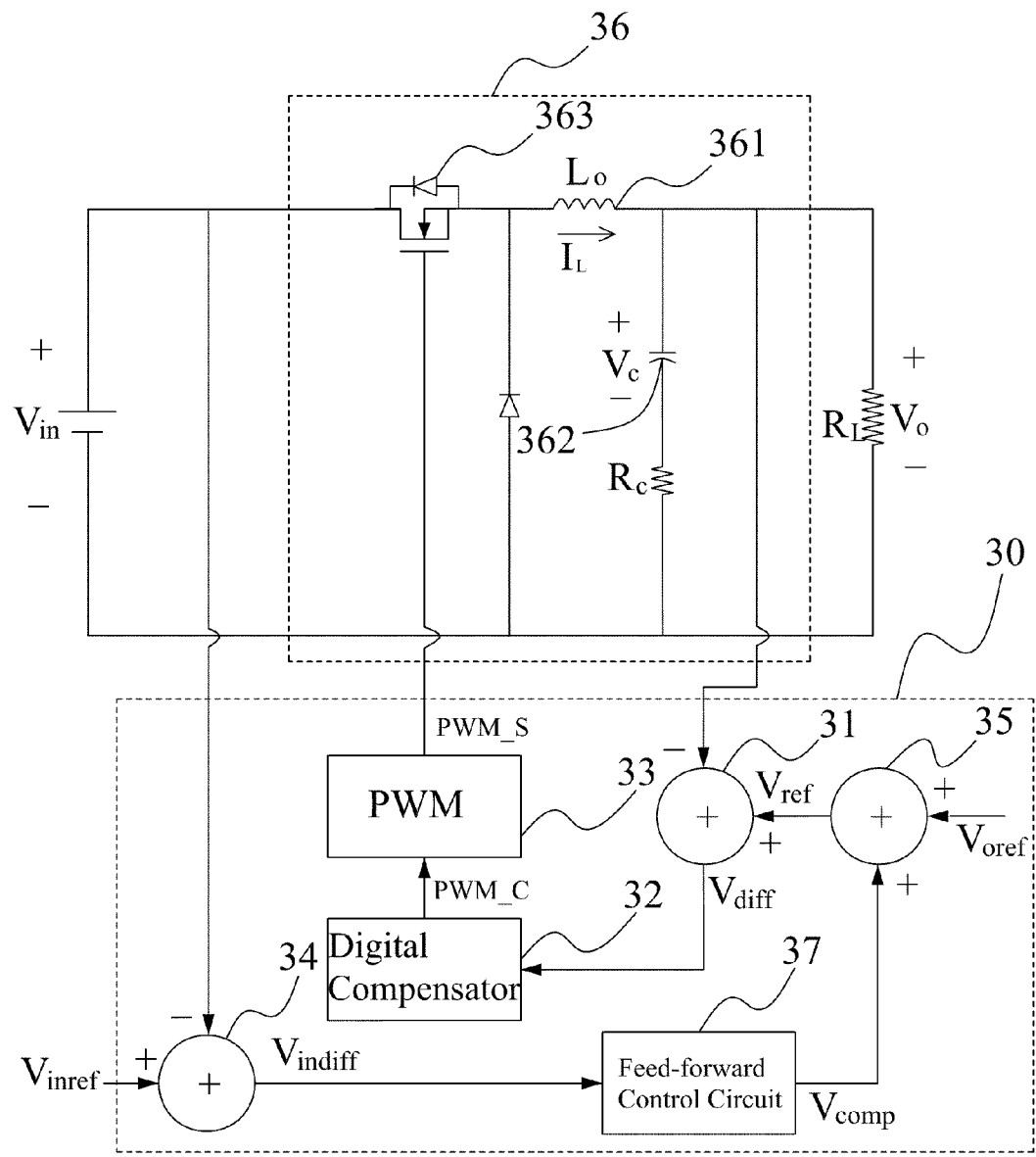
FIG. 3 is a block diagram illustrating the second embodiment of a control circuit for a power converter controlling adaptive voltage position according to the present invention.

Referring to FIG. 3, the second embodiment of a control circuit for a power converter controlling adaptive voltage position according to the present invention is illustrated. In FIG. 3, the control circuit 30 comprises adders 31, 34 and 35, a digital compensator 32, a pulse width modulation circuit 33 and a feed-forward control circuit 37 to perform steps of the control method for the power converter such that a pulse width modulation signal PWM_S is generated to control ON/OFF of a power switch 363 of a buck converter 36 with an inductor 361 and an output capacitor 362.

Wherein functions of the adder 31, the digital compensator 32 and the pulse width modulation circuit 33 are similar to the adder 21, the digital compensator 22 and the pulse width modulation circuit 23 shown in FIG. 2 such that no further details will be described. Besides, the adder 34 receives an input voltage $V_{in}$ and a reference input voltage $V_{inref}$ of the buck converter 36 and acquires an input voltage difference $V_{indiff}$ between the input voltage $V_{in}$ and the reference input voltage $V_{inref}$. The feed-forward control circuit 37 references to the input voltage difference $V_{indiff}$ to generate a compensation voltage $V_{comp}$; the adder 35 receives the compensation voltage $V_{comp}$ and a standard reference voltage $V_{oref}$ and calculates sum of the compensation voltage $V_{comp}$ and the standard reference voltage $V_{oref}$ to generate a reference output voltage $V_{ref}$ so as to be calculated by the adder 31 and generate an output voltage difference $V_{diff}$ for being referenced by the digital compensator 32.

Figure 4:
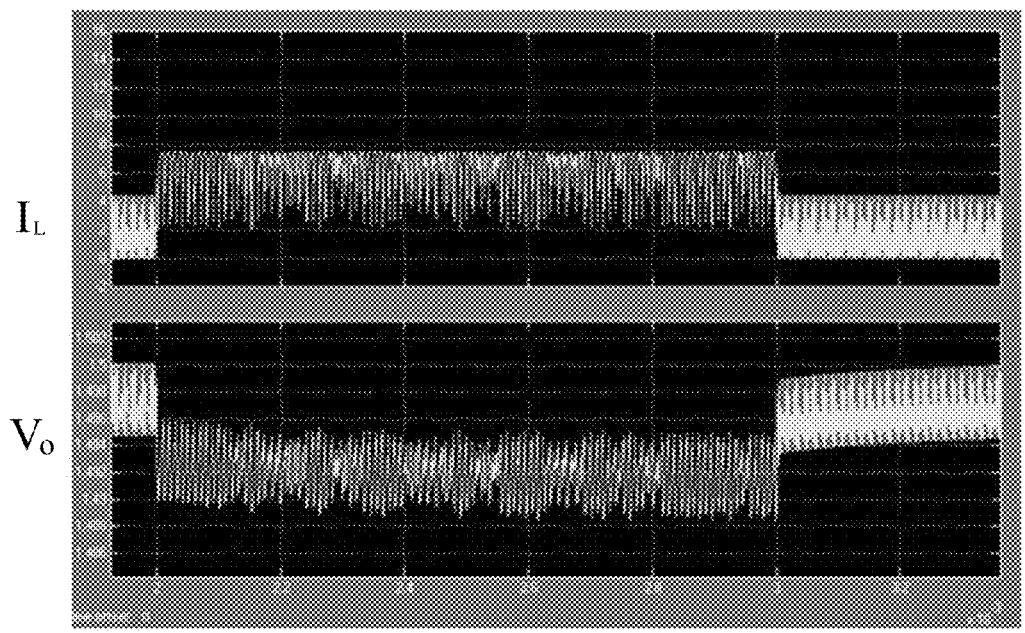
FIG. 4 is a graph illustrating waveform of voltage and current of the buck converter controlled by the control circuit shown in FIG. 3 during the load dynamically increasing.
Figure 5:
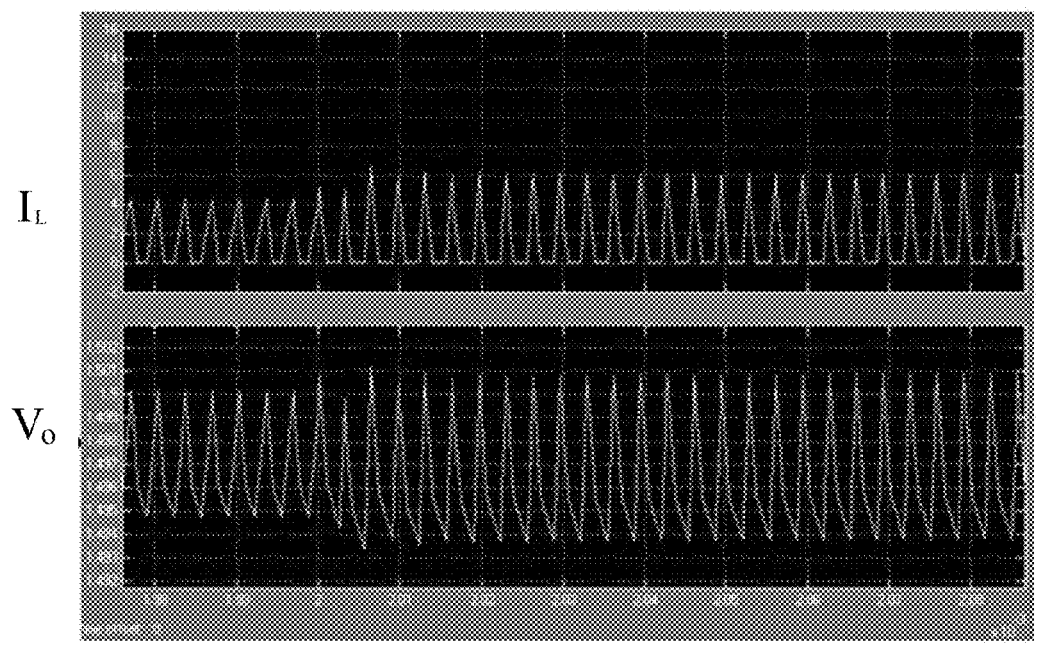
FIG. 5 is a graph illustrating waveform of voltage and current of the buck converter controlled by the control circuit shown in FIG. 3 during the input voltage increasing from 3V to 5V.
Figure 6:
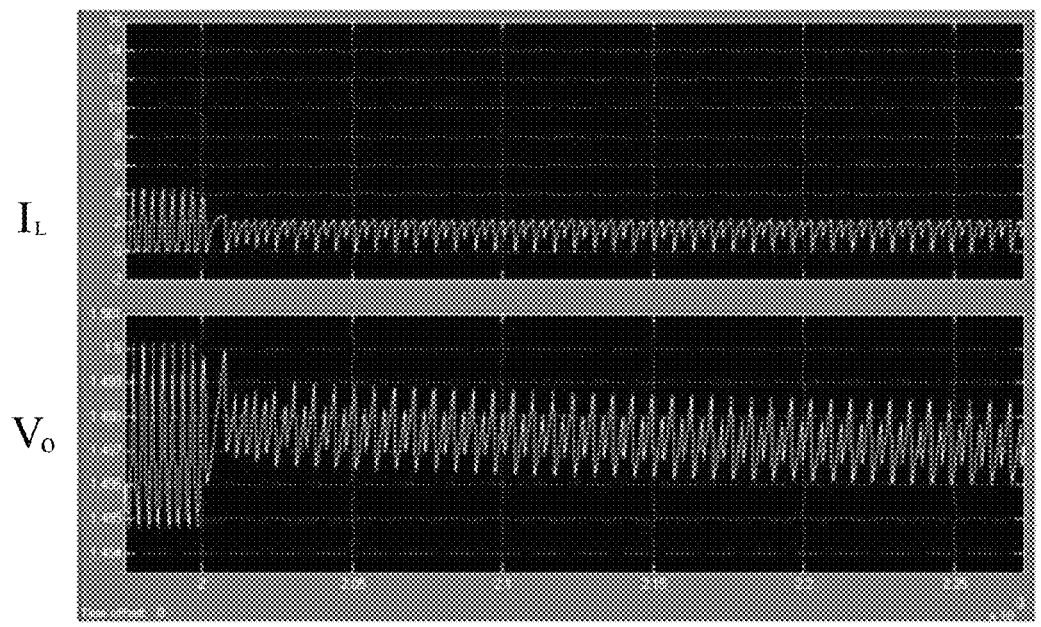
FIG. 6 is a graph illustrating waveform of voltage and current of the buck converter controlled by the control circuit shown in FIG. 3 during the input voltage decreasing from 3V to 2V.

Referring to FIGS. 4 to 6, results of simulations for the buck converter 36 shown in FIG. 3 with data set as inductance of the inductor 361 being 0.33 μH, capacitance of the output capacitor 362 being 1300 μF, parasitic resistance $R_C$ of the output capacitor 362 being 1 mΩ, resistance of load $R_L$ being 1Ω, reference input voltage $V_{inref}$ being 3V, and standard reference voltage $V_{oref}$ being 5V are illustrated. Wherein $I_L$ represents current of the inductor 361 and $V_o$ represents the output voltage of the buck converter 36.

In FIG. 4, it can be seen that when the load of the buck converter 36 increases dynamically, the waveform of the voltage and current of the buck converter 36 controlled by the control circuit 30 of the present invention show the effect of controlling the adaptive voltage position; in FIGS. 5 and 6, it can be seen that when the input voltage $V_{in}$ of the buck converter 36 is increased from 3V to 5V and decreased from 3V to 2V respectively, the voltage and the current of the buck converter 36 controlled by the control circuit 30 of the present invention show the output voltage $V_o$ without DC offset such that it is proved that the input voltage feed-forward control way performed by the adders 34, 35 and the feed-forward control circuit 37 is capable of eliminating the problem related to the line regulation of the voltage regulator.

While the invention has been described with referencing to the preferred embodiments thereof, it is to be understood that modifications or variations may be easily made without departing from the spirit of this invention which is defined by the appended claims.

What is claimed is:

1. A control circuit for a power converter controlling an adaptive voltage position comprising: a first adder receiving an output voltage and a reference output voltage of said power converter and acquiring an output voltage difference between the output voltage and the reference output voltage; a digital compensator connecting with the first adder, and having a Z-domain transfer function to reference said output voltage difference to generate a pulse width control signal; and a pulse width modulation circuit connecting with the digital compensator, and being controlled by the pulse width control signal to generate a pulse width modulation signal to control ON/OFF of a power switch in the power converter; wherein the Z-domain transfer function comprises a denominator coefficient with least significant bits being regulated to achieve a load line function via control of the pulse width control signal for enhancing an efficiency of the power converter, wherein said Z-domain transfer function is expressed as:

$$Comp_D(z) = \frac{\sum_{i=0}^{n} b_i \cdot z^{-i}}{1 + \sum_{i=0}^{n} a_i \cdot z^{-i}}$$

wherein $Comp_D(z)$ represents the Z-domain transfer function, $a_i$ represents the denominator coefficient, $b_i$ represents a numerator coefficient, n represents an order of a filter in the digital compensator; and when the denominator coefficient is a float point number, the regulated least significant bits are the least 4 significant bits of said float point number.

2. The control circuit as defined in claim 1 further comprises:
a second adder receiving an input voltage and a reference input voltage of said power converter and acquiring an input voltage difference between said input voltage and said reference input voltage;
a feed-forward control circuit referencing to said input voltage difference to generate a compensation voltage; and
a third adder receiving said compensation voltage and a standard reference voltage of said power converter to calculate a sum of said compensation voltage and said standard reference voltage to generate said reference output voltage.

3. The control circuit as defined in claim 1, wherein the load line function of said power converter is a positive load line function with which the output voltage is increasing.

4. The control circuit as defined in claim 1, wherein the load line function of said power converter is a negative load line function with which the output voltage is decreasing.

5. The control circuit as defined in claim 1, wherein the load line function of said power converter is a variable load line function with which the output voltage is variable.

6. A control method for a power converter achieving an adaptive voltage position, comprising following steps: acquiring an output voltage difference between an output voltage and a reference output voltage of said power converter; referencing said output voltage difference and an Z-domain transfer function to generate a pulse width control signal and regulating least significant bits of a denominator coefficient in said Z-domain transfer function so as to achieve a load line function via control of said pulse width control signal; and generating a pulse width modulation signal to control ON/OFF of a power switch in the power converter according to control of said pulse width control signal, wherein said Z-domain transfer function is expressed as:

$$Comp_D(z) = \frac{\sum_{i=0}^{n} b_i \cdot z^{-i}}{1 + \sum_{i=0}^{n} a_i \cdot z^{-i}}$$

wherein $Comp_D(z)$ represents the Z-domain transfer function, $a_i$ represents the denominator coefficient, $b_i$ represents a numerator coefficient, n represents an order of a filter in the digital compensator; and when the denominator coefficient is a float point number, the regulated least significant bits are the least 4 significant bits of said float point number.

7. The control method as defined in claim 6 further comprises following steps:
acquiring an input voltage difference between an input voltage and an reference input voltage of said power converter;
referencing said input voltage difference to generate a compensation voltage; and
calculating a sum of said compensation voltage and a standard reference voltage of said power converter to generate said reference output voltage.

8. The control method as defined in claim 6, wherein the load line function of said power converter is a positive load line function with which the output voltage is increasing.

9. The control method as defined in claim 6, wherein the load line function of said power converter is a negative load line function with which the output voltage is decreasing.

10. The control method as defined in claim 6, wherein the load line function of said power converter is a variable load line function with which the output voltage is variable.

* * * * *

UNITED STATES PATENT AND TRADEMARK OFFICE
CERTIFICATE OF CORRECTION

PATENT NO. : 8,421,429 B2
APPLICATION NO. : 12/701465
DATED : April 16, 2013
INVENTOR(S) : Lin et al.

It is certified that error appears in the above-identified patent and that said Letters Patent is hereby corrected as shown below:

Title Page, Item (73) Assignee: Delete "Richlek" and substitute therefor -- Richtek --.

Signed and Sealed this
Twenty-fifth Day of June, 2013

Teresa Stanek Rea
*Acting Director of the United States Patent and Trademark Office*